United States Patent Office 3,518,177
Patented June 30, 1970

3,518,177
PREPARATION OF POLYOXYMETHYLENE USING HIGH ENERGY RADIATION
Nelson S. Marans, Adelphi, Md., and Fred Jaffe, Cincinnati, Ohio, assignors to W. R. Grace & Co., New York, N.Y., a corporation of Connecticut
No Drawing. Continuation-in-part of applications Ser. No. 72,865, Dec. 1, 1960, Ser. No. 118,511, June 21, 1961, and Ser. No. 220,540, Aug. 30, 1962. This application July 5, 1966, Ser. No. 562,467
Int. Cl. C08f 1/24, 1/00
U.S. Cl. 204—159.21
11 Claims

ABSTRACT OF THE DISCLOSURE

High molecular weight polyoxymethylene is prepared by irradiating trioxane with high ionizing irradiation, and subsequently heating the irradiated trioxane below the melting point thereof to achieve polymerization.

---

This application is a continuation-in-part of our earlier filed applications, Ser. No. 220,540, filed Aug. 30, 1962; Ser. No. 118,511, filed June 21, 1961; and Ser. No. 72,865, filed Dec. 1, 1960, now abandoned.

This invention relates to a method of preparing a high molecular weight polyoxymethylene, and a novel polyoxymethylene polymer obtained thereby. More particularly it relates to production of polyoxymethylene by the irradiation of the formaldehyde polymer trioxane to obtain a new and useful polymer.

Trioxane is a cyclic trimer of formaldehyde having a six membered heterocyclic ring consisting of alternate oxygen atoms and methylene groups. Pure trioxane melts at 64° C. and boils without decomposition at about 115° C. It is known that trioxane may be polymerized in the presence of certain fluoride compositions such as inorganic fluorides to produce a high molecular weight polymer known as polyoxymethylene. Polymerization using these catalysts is complete after a period of about 1 to 7 days. Several other catalytic systems have been suggested for this polymerization reaction. Triethyl oxonium salts, hydrazinium compounds, dimethyl cadmium, diphenyl bismuth and diphenyl tin have also been used to catalyze the preparation of formaldehyde polymers.

We have found that suitable polymers of trioxane can be prepared by irradiating trioxane in an inert atmosphere. The preferred feature of the irradiation operation of this invention is treatment with high energy particles or corpuscular radiation.

The polymers of my invention are defined as having a satisfactory minimum degree of toughness. Degree of toughness is determined by subjecting the film, 3 to 8 mils in thickness, to a series of manual creasing actions. A single crease cycle consists of folding the film through 180°, creasing, and then folding in the reverse direction through 360° and creasing. The number of creasing cycles the film withstands before breaking is known as the degree of toughness. Thus, a film that cannot stand one complete cycle has a degree of toughness of 0. If it breaks on the sixth cycle, for example, it has a degree of toughness of 5.

In the description of this invention, the property of thermal stability is defined by the value of the rate constant for thermal degradation at 222° C. The degradation reaction is assumed to be a first order reaction which can be expressed mathematically by the differential equation:

$$-\frac{dw}{dt} = KW$$

where
$t$ is time from the beginning of decomposition;
$W$ is the weight of the material remaining at time $t$;
$K$ is the rate constant for the equation.

If an unstabilized material had a thermal stability such that the value of $K$ were greater than 2% per minute, the material would be considered too unstable to have any value as a polymer material. The value of this rate constant $K$ for thermal degradation at 222° C. was determined using the syringe stability test. In this test, the number of ml. of gas evolved per gram of polymer for each five minutes of elapsed time at 222° C. is measured and the results converted to give a value of the rate constant $K$. The stability of the sample is determined by heating a sample of the polymer, weighed to the nearest milligram, to 222° C. in a hypodermic syringe and observing the position of the syringe cylinder at five minute intervals after the beginning of the test. A 50 ml. syringe is preferred for making the test. The syringe is cleaned and the polymer, in the form of a pressed pellet, is weighed and placed in the syringe. The syringe is lubricated between the piston and cylinder with a high quality inert oil or grease material. The syringe is evacuated and filled with nitrogen several times. Silicone oil is drawn into the syringe and ejected until about 5 ml. remains. The oil surrounding the polymer pellet serves as a means for expelling all gases before the test and as a heat transfer medium during the test. The nozzle of the syringe is then sealed and the syringe placed in a vapor bath at 222° C. The vapor bath may be vapors of methyl salicylate. The position of the syringe cylinder is noted at five minute intervals after the syringe is first placed in the vapor bath. The test may be continued for periods of 30 minutes or more and the position of the syringe piston over each five minute period determined. The change in position over the heating period determines the amount of gas evolved in the test and thus the amount of polymer degraded to monomer.

The thermal degradation of the trioxane polymers generally follows that predicted for a first order reaction. The data collected in the syringe stability test is converted to give the rate constant for thermal degradation $K$ (222) using the equation:

$$K(222) = \frac{\text{volume of gas evolved in ml. in time } T \times 0.0736}{\text{time } T \text{ in minutes} \times \text{initial weight of the polymer sample in grams}}$$

The factor 0.0736 is a constant calculated on the assumption that the gas evolved is monomeric formaldehyde and that it follows the gas law as an ideal gas. A $K$ (222) value of 1 in reciprocal minutes is equivalent to 1% degradation per minute.

In general, our method for the preparation of polymerized trioxane involves irradiating a sample of trioxane maintained in the solid state to establish activated polymerization sites therein, and then holding the irradiated trioxane at a temperature above about 25° C. to allow polymer propagation to occur.

More specifically, the present invention contemplates a method for polymerizing trioxane to a dosage of from about 0.001 to about 10 megarads with ionizing radiations while maintaining the trioxane at a temperature of from about 0° C. to just below its melting point, and subsequently holding or aging the irradiated trioxane at a temperature of from about 25° C. up to about the thermal degradation temperature of the reactants for a time sufficient to develop polymerization of the irradiated trioxane.

In the generally preferred embodiment of the invention, irradiation is often most conveniently carried out at about room temperature, i.e. about 25° C., and subsequent polymerization is done at about the melting point of the irradiated trioxane, i.e. about 64° C.; however, temperatures in the broad ranges given above will suffice.

The trioxane monomer used in the present practice invention is selected or treated so as to contain less than about 2% by weight of water. Trioxane containing less than about 2% water is readily obtained by simple fractional distillation of water containing trioxane.

Furthermore, it is found that most commercially available trioxanes inherently contain less than 2% by weight water and hence may be used directly in the present procedure without intermediate purification.

In order to minimize the possibility of oxidation occurring at the activated polymerization sites of the irradiated trioxane, the irradiating and aging of the trioxane may be carried out in an inert atmosphere, i.e. inert gas or vacuum; however, it has been found that when the process is conducted in the solid state in the presence of air, generally satisfactory results are obtained.

The work-up of the polymerized reaction mixture involves the removal of the unreacted monomeric trioxane. This may be conveniently done by merely washing the water soluble trioxane from the insoluble polymer with water. Alternatively, the unreacted trioxane may be removed from the polymer by evaporation at room or elevated temperature with or without reduced pressure. This latter method permits the unreacted trioxane to be collected and recycled in the process without intermediate drying.

It is generally found that no appreciable polymerization, i.e. polymer propagation, occurs at temperatures below about 25° C. Hence, in the practice of the present invention activated sites or polymerization initiating sites may be induced in the trioxane at below 25° C. without any polymerization occurring at the time of irradiation. Such a procedure permits distribution of the desired number of activated sites in the trioxane before initiating polymerization which is done merely by raising the temperature above 25° C. By deferring polymerization until after activation by irradiation is completed, all activated specie commence to grow at the same instant, which results in a product generally having a more narrow molecular weight distribution than a product which is polymerized simultaneously and, hence, nonuniformly with irradiation. It is also noted that if radiation continues during polymerization scissioning occurs and a narrow but usually low molecular weight polymer will be obtained.

Subsequent to but not before irradiation in the solid state, the trioxane may be heated to a temperature above its melting point to induce rapid polymerization. Generally speaking, the polymerization rate increases with an increase in temperature and the most rapid way to obtain the maximum amount of polymerization in an irradiated sample is to heat it to temperatures above the melting point of trioxane. However, it has been found that a certain advantage is obtained when the polymerization (aging) is carried out below the melting point of trioxane and preferably at about 55° C. It is also found that by maintaining the sample in the solid state, the adverse effect that may be exerted by any impurities present in the trioxane is minimized. Consequently, it is found that if the process is carried out in the solid state, commercial grade trioxane produces quite satisfactory results without any prior purification.

The reduced specific viscosity was determined using γ-butyrolactone as a solvent. The solvent was incorporated with 0.5% of 4,4' thiobis (6-tert-butyl orthocresol) and 0.5% 2,6 - di-tert-butyl-p-cresol. In determining the reduced specific viscosity a weighed sample of the polymer was heated with a sufficient quantity of the γ-butyrolactone solvent to give a concentration of 0.1 g. per 100 ml. at 135° C. The sample was heated to 155° C. to effect rapid solution of the polymer in the solvent. After the polymer had dissolved the liquid was added to a standard Stabin viscometer in a Hallikainen bath maintained at 135° C.

The reduced specific viscosity was determined using the formula $$\frac{nsp}{C} = \frac{\frac{t_2 - t_1}{t_1}}{C \text{ g.}/100 \text{ ml.}}$$

The unit of reduced specific viscosity is deciliter g.—1. The unit $t_2$ is defined as the running time of the solution and $t_1$ the running time of the pure solvent. The differences in reduced specific viscosity are apparent from the differences in flow times in the viscometer. The reduced specific viscosity is significant in that it is a measure of the molecular weight of the polymer. The exact relative molecular weights cannot be determined without knowing the value of the exponent $\alpha$ in the Mark-Houwink equation $n = KM^\alpha$.

Although the crude polymers have a good thermal stability, their stability may be improved by further treatment. A typical method of improving the stability of these polymers is as follows. The crude product is dissolved in a suitable solvent such as dimethylformamide or ethylene carbonate, for example, and small amounts of stabilizing materials are added to the polymer solution.

The polymer is precipitated by suitable cooling methods such as pouring the solution into cold alcohol. The precipitated polymer is removed by filtration, washed and dried. The polymers may also be treated with stabilizing materials by milling the material into the polymer or depositing the stabilizers in solution onto the solid polymer, etc.

Although polymers prepared in the examples set out below were prepared using a high energy radiation from a Van de Graaff electron accelerator, it should be understood that the present invention is not limited thereto. Irradiation employing particles in the instant invention include the use of positive ions such as protons, alpha particles and deuteron as well as electrons or neutrons. The charged particles may be accelerated to high speeds by means of various voltage gradient mechanisms such as the Van de Graaff generator, the Cyclotron, the Cockroft Walton accelerator, the resonant cavity accelerator, the Betatron, the resonant transformer such as the machine built by General Electric Corporation, the synchrotron or any other suitable accelerating device. Particle irradiation may also be supplied from radioactive isotopes or an atomic pile. Furthermore, high energy particles such as X-rays and gamma-rays may be used to create the activated specie.

The amount of high energy radiation which is employed in irradiating the trioxane in this invention can vary between 0.001 and 10.0 megarads. Preferably, however, low radiation dosages that are less than 5 megarads are employed. A preferred radiation dosage is in the range of 0.02 to 1.0 megarad. Such radiation dosages are advantageous not only in that they decrease the cost of irradiating the materials but also in that they are time saving since one rapid pass would usually suffice to give the desired dosage. Variations in dose rate do not appear to have much effect on the final polymer nor on the yield as long as the irradiation temperature is maintained below the propagation temperature of about 25° C. In addition, radiation carried out at above the propagation temperature tends to cause scission of the polymer and thus reduce its molecular weight. At temperatures in excess of 25° C. propagation takes place simultaneously with irradiation, hence, preventing all activated sites from having equal access to monomer. This, in turn, prevents uniform polymerization which results in a product that varies with variations in dose rate. Irradiations are preferably, but not necessarily, performed in an inert atmosphere or vacuum. This is to insure the exclusion of oxygen or other materials which might deactivate the active sites as they are formed. In the examples herein, pure lamp grade nitrogen was used as an inert atmosphere. However, noble gases, especially argon, are equally suitable. While inert atmospheres are generally preferred in the practice of the present invention, in order to eliminate the interjection of an undeterminable factor in the reaction, namely oxidation of activated polymerization sites, it has been found that as a practical matter the presence of oxygen in atmospheric quantities influences the characteristics of the final product by only a very small amount and does little or nothing to diminish the total polymer yield.

The irradiation may be carried out at temperatures from below room temperature to a temperature just below the melting point of the trioxane. However, polymerization is accomplished most rapidly when the trioxane is irradiated near the melting point rather than at room temperature. Polymerization apparently takes place during the irradiation only if the trioxane is maintained above about 25° C. As mentioned previously, the polymerization continues after irradiation and a maximum yield of polymer is recovered when the aging step is carried out just below the melting point of the monomer and then finally melted. The melting procedure is most advantageously carried out when the irradiation is done at a temperature where only initiation but no propagation occurs, i.e., below 25° C.; or if aging is done only for limited periods not close to the melting point, i.e., below about 55° C. Excessive temperatures are to be avoided, however, since irradiation of trioxane above the melting point gives a very low yield of the polymer.

The pressure during the irradiation is not critical but for reasons of economy and ease of operation, we prefer to carry out the polymerization reaction at nearly atmospheric pressure. The normal method of polymerization is to substitute the air surrounding the sample with nitrogen at atmospheric pressure. Exclusion of air, however, is not absolutely necessary for the successful practice of the invention.

The irradiation time and, hence, the dose rate may vary. For a large dose of irradiation, as many as ten passes may be made at about 1 megarad per pass. For lower dosages the trioxane is normally irradiated in one single pass to the desired dosage. However, with a low dose rate source, a number of passes or longer dwell time might be required. The time of heating of the sample after irradiation is fairly important. The temperature of this aging step can vary from room temperature to about 55–60° C. High yields were obtained when the trioxane was irradiated to a dosage of 0.1 megarad and then allowed to age at a temperature of about 55° C. for a period of two days with melting afterwards. High yields of polymer were also obtained by irradiating the trioxane to a dosage of 2 megarads at a temperature of about 55° C. followed by aging at room temperature or at 55° C. for a period of seven days. However, the aging time may be reduced by using the higher temperature while remaining below the melting point of the monomer.

When polyoxymethylene polymer is prepared in accordance to the embodiment of the present invention, wherein the aging step is conducted at a temperature below that of the melting point of the irradiated trioxane, a novel and useful fibrous polymeric structure is obtained. This novel polyoxymethylene, when examined by a standard X-ray crystallographic technique, is found to possess an identity period of 14 A. along the fiber axis. That is, within experimental variations the identity distances found for the present polyoxymethylene polymer are equal to or submultiples of an identity period of 14 A. On the other hand, it is generally known that polyoxymethylene polymers formed by conventional prior art methods, i.e., chemical and sublimation polymerization methods, possess an identity period of 17 A. along the fiber axis.

The precise reason why the present polyoxymethylene polymer possesses an identity period substantially less than that of prior art polyoxymethylene is not definitely understood, however it might be suggested that the unit cell possessed by the present polymer may contain two less oxymethylene units than the prior art material. In other words, experimental evidence strongly indicates the helical unit cell structure of the present material possesses seven repeating oxymethylene units in lieu of the nine repeating units ordinarily reported for conventional polyoxymethylene.

Regardless of the reason why the present polyoxymethylene polymer possesses a different identity period along the fibre axis than that of prior art material, it is found that the present polymer possesses other characteristics that distinguish it over that material previously prepared. The present polymers generally possess higher melting points (185–200° C.) than prior art polyoxymethylene which normally melts at about 180° C. Furthermore, the present polymer possesses a unique fibrous structure that is never found in polyoxymethylene which has been prepared by prior art processes.

The invention is further illustrated by the following specific but non-limiting examples.

EXAMPLE I

The efficiency of the irradiation was evaluated in an experiment in which samples of trioxane were placed in a glass ampule and the air in the ampule displaced by an atmosphere of nitrogen. The samples were irradiated at a temperature of 55° C. and the sample then heated above the melting point of the monomer for several minutes unless otherwise noted. After the irradiation and melting steps the material was removed from the ampule, ground, weighted, treated with water for about 24 hours and filtered in a sintered glass crucible. The product was heated at 55° C. for one day and weighed. The percentage of polymer formed was determined in this manner. It is obvious that the water treatment would remove any unreacted polymonomer.

The data of these runs are tabulated in Table I below.

TABLE I

| Run | Dosage (megarads) and dose rate | Temperature of irradiation | Percent polymer | Reduced specific viscosity in deciliters g.−1 |
|---|---|---|---|---|
| 1 | 0.1 mr. at 0.1 mr./pass. | 55 | 8.4 | 1.01 |
| 2 | 0.5 mr. at 0.5 mr./pass. | 55 | 24.2 | 1.09 |
| 3 | 2 mr. at 1 mr./pass | 55 | 93.5 | 0.20 |
| 4 | 2 mr. at 0.1 mr./pass | 55 | 97.3 | 0.11 |
| 5 | 2 mr. at 1 mr./pass | 25 | ¹ 0.2 | |
| 6 | 5 mr. at 1 mr./pass | 55 | 91.7 | 0.06 |
| 7 | 10 mr. at 1 mr./pass | 55 | 83.6 | 0.04 |

¹ These samples were not heated to 80° C. after irradiation and before analysis.

It is apparent from an examination of these data that yields of about 80% or better can be obtained by irradiating the trioxane to a dosage of 2 to 10 megarads followed by melting the polymer. A comparison of the data collected in runs 1 through 4 with the data collected in the runs 6 and 7 would indicate that a 2 megarad dose or less is most desirable. Increasing the dosage to 5 to 10 megarads does not appreciably increase the yield above that for 2 megarads. In addition, operation at these dosage levels, 5 and 10 mr., is not practical because the product is a low molecular weight material. Run 5 emphasizes the need for melting of the irradiated monomer if the irradiation occurs at 25° C. and if no aging of the monomer is used.

EXAMPLE II

The effect of the aging of the irradiated material was shown in the group of experiments in which the trioxane was irradiated using the technique described in Example I above. Some samples were heated to 80° C. to insure melting of the monomer after the aging step. The results of this series of runs is shown in Table II below.

erization, removed from the ampule, washed and the percentage yield determined.

TABLE IV

| Run | Dosage (megarads) and dose rate | Temperature of irradiation | Percent polymer | RSV in deciliters g.−1 |
|---|---|---|---|---|
| 1 | 0.02 mr. at 0.02 mr./pass. | 55 | 3.1 | 0.64 |
| 2 | 0.05 mr. at 0.05 mr./pass | 55 | 6.0 | 0.39 |
| 3 | 0.1 mr. at 0.1 mr./pass. | 55 | 9.8 | 0.47 |
| 4 | 0.3 mr. at 0.3 mr./pass. | 55 | 37.6 | 0.48 |
| 5 | 0.3 mr. at 0.05 mr./pass. | 55 | 31.1 | 0.35 |
| 6 | 0.6 mr. at 0.6 mr./pass. | 55 | 58.0 | 0.41 |

It is obvious from an examination of this data that increasing the dosage about 30 fold increases the yield by a factor of almost 20. It is also seen that at increasing

TABLE II

| | | | Aging step | | | |
|---|---|---|---|---|---|---|
| Run | Dosage (megarads) and dose rate | Temperature of irradiation | Time in days | Temperature in ° C. | Percent polymer | RSV in deciliters g.−1 |
| 1 | 2 mr. at 1 mr./pass | 55 | 2 | 55 | [1] 98.8 | 0.15 |
| 2 | 2 mr. at 1 mr./pass | 55 | 2 | 55 | 96.5 | 0.16 |
| 3 | 2 mr. at 1 mr./pass | 55 | 2 | 25 | 79.8 | 0.18 |
| 4 | 2 mr. at 0.1 mr./pass | 55 | 7 | 55 | 97.6 | 0.12 |
| 5 | 2 mr. at 0.1 mr./pass | 55 | 7 | 55 | [1] 100.0 | 0.11 |

[1] These samples were heated to 80° C. after the aging step and before analysis.

The importance of the aging at 55° C., if no step of melting of the irradiated monomer is used, is shown by comparison of runs 1 and 5 in this table with runs 3 and 4 respectively in Table I. The irradiation dose rate was the same in the compared cases. The importance of the aging temperature is shown by comparing runs 2 and 3 in this example. In run 2 of this example the product was aged at a temperature of 55° C. for two days to give 96.5% polymerization whereas in run 3 aging at room temperature for two days of a similarly irradiated sample gave only a 79.8% yield. It should be noted that runs 2, 3 and 4 clearly illustrate that a high degree of polymerization may be obtained when in the absence of a melting step.

EXAMPLE III

The effect of dose rate, dosage and aging after irradiation was determined using the techniques described in Example I. The maximum dosage in these runs was 0.6 megarad. The effect of these variables are shown in Tables III and IV. The samples in Table III were subjected to the aging step at temperatures of 55–60° C. for periods up to 7 days and then melted at 80° C. before analysis. The data collected in this series of runs are tabulated below.

TABLE III

| | | | Aging step | | | Reduced specific viscosity in deciliters g.−1 |
|---|---|---|---|---|---|---|
| Run | Dosage (megarads) and dose rate | Temperature of irradiation | Time in days | Temperature in ° C. | Percent polymer | |
| 1 | 0.1 mr. at 0.1 mr./pass | 60 | 0 | | 16.1 | 0.64 |
| 2 | 0.1 mr. at 0.02 mr./pass | 60 | 0 | | 22.4 | 1.02 |
| 3 | 0.1 mr. at 0.1 mr./pass | 55 | 0 | | 9.8 | 0.41 |
| 4 | 0.1 mr. at 0.1 mr./pass | 55 | 0.25 | 55 | 27.6 | 1.28 |
| 5 | 0.1 mr. at 0.1 mr./pass | 55 | 2 | 55 | 48.0 | 1.70 |
| 6 | 0.1 mr. at 0.1 mr./pass | 55 | 4 | 55 | 60.8 | 1.60 |
| 7 | 0.1 mr. at 0.1 mr./pass | 55 | 7 | 55 | 54.2 | 1.83 |

It is apparent from an examination of these data that a fair yield of the polymer can be obtained with as little as 0.1 megarad. A comparison of the data in runs 3, 4 and 5 show the improvement obtained when the irradiated material is aged for 0.25, 2 and 4 days at a temperature of 55° C. The yield of polymer increased from 9.8% to 27.6 to 48% to 61% by this treatment. In addition, the molecular weight increased on aging from 0 to 0.25 to 2 days. The effect of increasing irradiation dosage by a factor of 30 was determined by irradiating trioxane using the techniques described in Example I. The results are shown in Table IV. The irradiations were all carried out at a temperature of about 55° C. The irradiated material was not aged but was heated to 80° C. to insure polymerization, removed from the ampule, washed and the percentage yield determined.

dosages a decreasing RSV value is generally obtained. This indicates that at higher dosage levels a reduction in molecular weight occurs, which is probably due to radiation degradation when more than one pass is used, and to competition for monomer when only one pass is used.

EXAMPLE IV

The effect of temperature variations within the approximate melting point of the trioxane was investigated in a series of runs in which the dosage and dose rate were constant and the temperature varied from 45–60° C. The irradiation was carried out using the techniques described in detail in Example I. The irradiated material was not aged in any of these samples but was heated to 80° C., removed from the ampule, washed and filtered to determine the yield using the techniques described in Example I. The data are tabulated below.

TABLE V

| Run | Dosage (megarads) and dose rate | Temperature of irradiation | Percent polymer | RSV in deciliters g.−1 |
|---|---|---|---|---|
| 1 | 0.1 mr. at 0.1 mr./pass. | 45 | 9.9 | 0.68 |
| 2 | 0.1 mr. at 0.1 mr./pass. | 50 | 9.6 | 0.76 |
| 3 | 0.1 mr. at 0.1 mr./pass. | 55 | 9.8 | 0.47 |
| 4 | 0.1 mr. at 0.1 mr./pass. | 60 | 9.8 | 0.39 |

It is apparent from an examination of the data that there is no particular advantage in increasing the irradiation temperature from 45° C. to 60° C. when trioxane is irradiated at a dosage of 0.1 megarad per pass and when the product is substantially melted after the irradiation. The yield was approximately 10% in each of these runs.

EXAMPLE V

The effect of varying the aging conditions and melting conditions for monomer irradiated to a dosage of 0.1 megarad can be seen from the following series of runs.

The monomer melts at 64° C. The irradiation was carried out using the techniques described in detail in Example I.

TABLE VI

| Run | Dosage and dose rate (megarads) | Temperature of irradiation, ° C. | Aging step | | Melted[1] | Percent polymer | RSV in deciliters g.−1 |
|---|---|---|---|---|---|---|---|
| | | | Time in days | Temperature in ° C. | | | |
| 1 | 0.1 mr. at 0.1 mr./pass. | 25 | 0 | | No | <0.1 | |
| 2 | 0.1 mr. at 0.1 mr./pass. | 55 | 0 | | No | 4.7 | 0.36 |
| 3 | 0.1 mr. at 0.1 mr./pass. | 55 | 0 | | Yes | 10.4 | 0.69 |
| 4 | 0.1 mr. at 0.1 mr./pass. | 55 | 2 | 25 | No | [2] 7.0 | 0.45 |
| 5 | 0.1 mr. at 0.1 mr./pass. | 70 | 0 | | Yes | 0.2 | |
| 6 | 0.1 mr. at 0.1 mr./pass. | 70 | 1 | 55 | Yes | <0.1 | |
| 7 | 0 | | 2 | 55 | Yes | <0.1 | |
| 8 | 0.1 mr. at 0.1 mr./pass. | 55 | 1 | 55 | Yes | 48.0 | 1.70 |
| 9 | 0.1 mr. at 0.1 mr./pass. | 55 | 1 | 70 | Yes | 18.8 | 0.57 |

[1] These samples were melted at 70° C. after completion of irradiation and aging treatments when marked Yes.
[2] Polymerization occurs during irradiation, during the cooling period to 25° C., and also possibly at room temperature.

Runs 1 and 2 of this example demonstrate that polymerization occurs during irradiation close to the melting point while none occurs at 25° C. Run 3 compared to run 2 demonstrates that additional polymerization occurred on melting the sample. Run 4 compared respectively to run 2 demonstrates some continued polymer formation on aging at room temperature. Run 5 demonstrates the lack of polymerization on irradiating in the melt. Run 6 indicates that no site is formed in the melt that will give polymerization on aging in the solid state. Run 77 shows that heat aging of unirradiated monomer at 55° C. gives essentially no polymerization. A comparison of runs 8 and 9 indicates that it is more efficient to age in the solid state than in the melt.

EXAMPLE VI

The criticality of the aging temperature after irradiation in the solid state is shown in the following Table VII. All samples were irradiated at 25° C. at a dose of 0.3 megarad and then aged for varying periods of time at temperatures from 25° to 60° C. Representative values of about 15 and 30% polymerization were chosen and the times required to give these percentages at various aging temperatures are given. The high molecular weights obtained are indicated by reduced specific viscosity (RSV) measurements. Percentage polymerization was determined by water washing of pulverized sample and drying in air for two days at 55° C.

TABLE VII

| Temperature of aging, ° C. | Time to obtain approximately 15% polymer, hrs. | Actual percent conversion, RSV | Time to obtain approximately 30% polymer, hrs. | Actual percent conversion, RSV | Computed[1] time to obtain 30% conversion, hrs. |
|---|---|---|---|---|---|
| 35[2] | 24.0 | 14.2±1.6 (1.38) | 96 | 36.1±1.0 (1.89) | 64.0 |
| 45 | 2.0 | 1.90±0.3 (1.03) | 4.5 | 25.6±1.5 | 5.50 |
| 50 | 0.50 | 15.0±0.3 (0.85) | 2.0 | 27.0±0.1 (1.44) | 2.30 |
| 55 | 0.25 | 15.0±0.3 (0.83) | 1.0 | 28.5±0.2 (1.48) | 1.10 |
| 60 | 0.25 | 18.8±0.3 (1.04) | | | 0.75 |

[1] The "computed" time to 30% conversion was obtained from a series of data including the above that gave a linear plot of log time versus polymerization percentage.
[2] No high molecular weight polymer was isolated even after 96 hours at 25° C.

EXAMPLE VII

The relatively slight effect of air as compared to vacuum on the irradiation and aging of trioxane is shown in the following Table VIII. In both cases, the monomer was purified by distillation into 10 mm. O.D. tubes in one case sealed at a pressure of less than 0.3 mm. Hg and in the other case sealed in the presence of air at 760 mm. Hg pressure. The prepared polymer was isolated by water washing and after filtration, dried for two days at room temperature.

TABLE VIII

| Atmosphere | Irradiation temp., ° C. | Dose, mr. | Aging temp., ° C. | Aging time, hrs. | Polymerization, percent | RSV |
|---|---|---|---|---|---|---|
| Vacuum | 25 | 0.1 | 55 | 6 | 31.6±0.2 | 2.34 |
| Air | 25 | 0.1 | 55 | 6 | 31.0±0.9 | 2.10 |
| Vacuum | 55 | 0.1 | None | None | 4.02±0.07 | 0.49 |
| Air | 55 | 0.1 | None | None | 4.01±0.14 | 0.49 |

EXAMPLE VIII

The relatively minor effect of the purity of trioxane on the polymerization of trioxane is shown in the following Table IX. The pure samples were distilled and sealed in a vacuum of less than 0.3 mm. Hg pressure. The crude trioxane was commercially available material (Celanese) used without any purification procedure, melted in the tube and then sealed uder the same conditions as above.

TABLE IX

All samples irradiated to 0.3 mr. and aged in constant temperature bath for stated time.

| Purity | Aging time, hrs. | Polymerization, percent | RSV |
|---|---|---|---|
| Pure | 0.25 | 15.0±0.3 | 0.83 |
| Crude | 0.25 | 16.4±0.1 | 0.84 |
| Pure | 0.50 | 22.1±0.4 | 1.02 |
| Crude | 0.50 | 21.7±0.5 | 0.97 |
| Pure | 1.0 | 28.4±0.3 | 1.48 |
| Crude | 1.0 | 26.5±0.3 | 1.23 |
| Pure | 2.0 | 36.5±0.8 | 1.60 |
| Crude | 2.0 | 33.4±0.8 | 1.50 |
| Pure | 4.0 | 47.2±0.5 | 1.76 |
| Crude | 4.0 | 40.4±0.2 | 1.80 |
| Unirradiated crude | 0 | 0.06±0.01 | |

EXAMPLE IX

The absence of any substantial difference between the polymerization percentage for a melted sample aged close to the melting point and for a sample aged at the same temperature but not melted after irradiation is shown in Table X. Samples were prepared and analyzed as described for pure samples in Example VIII. Irradiation and aging were at 55° C. with immediate analysis after irradiation.

TABLE X

| Dose, mr. | Aging time, days | Melt | Polymerization, percent |
|---|---|---|---|
| 0.3 | 1.0 | No | 59.4±1.5 |
| | | Yes | 54.2±5.0 |
| 0.1 | 0.20 | No | 14.7±0.3 |
| | | Yes | 14.4±0.3 |
| | 1.0 | No | 31.1±1.5 |
| | | Yes | 32.8±7.2 |
| 0.03 | 0.20 | No | 8.2±0.9 |
| | | Yes | 7.6±0.5 |
| | 1.0 | No | 14.6±1.5 |
| | | Yes | 13.3±0.6 |

EXAMPLE X

The selection of maximum dose limits is made possible from Table XI. Samples were prepared in the same manner as for Example IX. All samples were irradiated at 25° C. and aged for 0.5 hour at 55° C. before analysis.

TABLE XI

| Dose, mr. | Polymerization percent | RSV |
|---|---|---|
| 0.5 | 26.4±0.2 | 1.00 |
| 0.75 | 32.0±0.3 | 0.91 |
| 1.0 | 31.2±0.9 | 0.83 |
| 1.5 | 31.4 | 0.69 |
| 2.0 | 27.8±0.8 | 0.56 |
| 3.0 | 18.8±0.3 | 0.38 |

As can be seen by the above table, an increase in dose above 0.75 megarad decreases the RSV without increasing the percentage yield.

EXAMPLE XI

Representative samples of these materials prepared by the techniques described in these examples were checked to determine the film forming properties and thermal stability. The degree of toughness and thermal stability were determined using the techniques described above. The data collected in these runs are tabulated in Table XII below.

TABLE XII

| | Properties of Polymer | | |
|---|---|---|---|
| Dosage (megarads) and dose rate | Temperature of irradiation, ° C. | Degree of toughness | $K_{222}$ |
| 0.1 mr. at 0.1 mr./pass | 60 | >1 | |
| 0.1 mr. at 0.02 mr./pass | 60 | >1 | |
| 0.1 mr. at 0.1 mr./pass | 55 | >1 | 1.4 |
| 0.1 mr. at 0.1 mr./pass | 55 | >1 | 1.7 |

An examination of the data indicates that a film with suitable degree of toughness can be prepared from a polymer obtained by irradiating trioxane. A high thermal stability is obtained from these polymers. The $K_{222}$ values were 1.4 and 1.7 respectively which indicates a very good stability for a material that had not been subjected to any stabilization treatment.

EXAMPLE XII

The trioxane polymer was stabilized using conventional stabilization techniques. A 3.8 g. charge of the polymer having a $K_{222}$ of 1.7 was dissolved in 40 ml. of ethylene carbonate. A total of 0.045 g. of calcium acetate was added to the solution and the mixture was refluxed with stirring for 20 minutes. At the end of this period the solution was poured into 200 ml. of cold ethyl alcohol. The polymer precipitated as a fine white solid which was filtered, washed with 150 ml. of water followed by a wash with 200 ml. of acetone and then dried in a vacuum at a temperature of 80° for approximately 12 hours. The rate constant for thermal degradation ($K_{222}$) of this material was determined. The constant was found to be 0.54 weight percent per minute.

It is apparent from this data that the polymer prepared by the irradiation technique can be treated to give an extremely stable product.

EXAMPLE XIII

This specific example illustrates that the present radiation polymerized polyoxymethylene possesses a novel crystalline arrangement.

A crystal of trioxane was sealed in an evacuated capillary tube, and then subjected to 0.3 megarad of 2 mev. electrons. This irradiated trioxane was held at room temperature for 25 hours, and then heated at 55° C. for 0.5 hour whereupon polymerization took place. A fibrous crystalline polymeric structure which was oriented along the axis of the initial trioxane crystal was obtained.

The X-ray diffraction pattern of the polymer was then determined using a standard technique which is generally disclosed in M. J. Buerger, X-Ray Crystallograph (1942).

In the specific studies disclosed herein the X-ray radiation used was the K-alpha doublet of copper. A rotating-crystal X-ray camera, having a 5.73 cm. radius, as manufactured by Charles Supper Co. of Newton Center, Mass., was used to record the diffraction pattern. The polymer material was mounted in a manner that positioned the polymer fibres coaxial with the rotational axis of the camera, and a diffraction pattern photograph was prepared. The distances (Y) from an undiffracted spot on the photograph to each series of diffracted spots were measured.

Using the relation $$T = \text{lambda}/\sin \tan^{-1}(Y/R)$$

where lambda is the wavelength of the radiation (1.543 A.) and R is the radius of the camera (5.73 cm.), identity distances T were calculated from the measured values of Y. The values obtained for T are given below.

Identity distances (A.)

13.9±0.5

7.0±0.2

4.64±0.09

3.49±0.07

Examination of the above data indicates that, within experimental variations, the identity distances found were equal to or submultiples of an identity period of 14 A. along the polymeric fiber axis. Polyoxymethylene prepared by conventional chemical polymerization techniques possesses an identity period of about 17 A.

The irradiated sample which was aged at 55° C. for four hours yielded the same diffraction pattern.

Obviously many modifications and variation of the invention as hereinabove set forth may be made without departing from the essence and scope thereof and only such limitations should be applied as are indicated in the appended claims.

What is claimed is:

1. A process for preparing high molecular weight polyoxymethylene which comprises irradiating solid trioxane with high energy ionizing radiation, and recovering the polyoxymethylene formed thereby.

2. The process of claim 1 wherein said solid trioxane is irradiated at a dosage of 0.001 to 10 megarads.

3. The process of claim 1 wherein the said solid trioxane is irradiated at a temperature of 25–60° C.

4. The process of claim wherein electrons are the source of ionizing radiation.

5. A process for preparing high molecular weight polyoxymethylene which comprises irradiating solid trioxane with high energy ionizing radiation, polymerizing said irradiated trioxane at a temperature above about 25° C. to cause polymerization thereof, and recovering the polyoxymethylene found.

6. The process of claim 5 wherein said trioxane maintained in the solid phase is irradiated at a dosage of 0.001 to 10 megarads.

7. The process of claim 5 wherein the trioxane is momentarily heated to above the melting point thereof subsequent to the polymerizing step.

8. The process of claim 5 wherein said irradiated trioxane is polymerized at a temperature of from about 25° to 63° C.

9. A process for perparing high molecular weight polyoxymethylene which comprises irradiating trioxane maintained at a temperature of below about 25° C. with ionizing radiation at a dosage of 0.001 to 10 megarads, heating said irradiated trioxane to a temperature of from about 25° C. to about 63° C. to cause polymerization thereof, and recovering the polyoxymethylene found thereby.

10. A method for the manufacture of polyoxymethylene which comprises subjecting trioxane in the solid state to high energy ionizing radiation at a temperature within the range of from 0° to 60° C. and thereafter separating the polymerized product from trioxane by dissolving trioxane in a solvent.

11. A method for the manufacture of polyoxymethylene, which comprises subjecting trioxane to high energy, ionizing radiation at a temperature within the range of from 0° to 60° C. and heating the mass at a temperature of about 60° C. and thereafter separating the polymerized product from trioxane by dissolving trioxane in a solvent.

References Cited

UNITED STATES PATENTS

| 3,242,063 | 3/1966 | Okamura et al. | 204—154 |
| 3,005,799 | 10/1961 | Wagner | 260—67 |

MURRAY TILLMAN, Primary Examiner

R. B. TURER, Assistant Examiner

U.S. Cl. X.R.

260—67